United States Patent [19]

Araki

[11] Patent Number: 4,984,147
[45] Date of Patent: Jan. 8, 1991

[54] CONTROL METHOD FOR PWM CONVERTER

[75] Inventor: Hiroshi Araki, Aichi, Japan

[73] Assignee: Mitsubishi Denki Kabushiki Kaisah, Japan

[21] Appl. No.: 497,185

[22] Filed: Mar. 22, 1990

[30] Foreign Application Priority Data

May 12, 1989 [JP] Japan ................................ 1-119416

[51] Int. Cl.[5] ............................................. H02M 7/04
[52] U.S. Cl. ...................................... 363/84; 363/89; 363/125; 363/127
[58] Field of Search ....................... 363/84, 85, 87, 89, 363/125, 127, 129

[56] References Cited

U.S. PATENT DOCUMENTS

| | | | |
|---|---|---|---|
| 4,320,305 | 3/1982 | Thomas | 363/87 |
| 4,399,395 | 8/1983 | Espelage | 363/129 |
| 4,447,868 | 5/1984 | Turnbull | 363/127 |
| 4,495,557 | 1/1985 | Weit | 363/89 |
| 4,523,267 | 6/1985 | Mehl | 363/129 |
| 4,599,685 | 7/1986 | Hombu et al. | 363/89 |
| 4,670,827 | 6/1987 | Schneider | 363/87 |
| 4,816,985 | 3/1989 | Tanahashi | 363/87 |
| 4,847,744 | 7/1989 | Araki | 363/49 |

OTHER PUBLICATIONS

Okuyama et al, "High Performance AC Motor Speed Control System Using GTO Converters", International Power Electronics Conference, Mar. 27–31, 1983, pp. 720–731.

Primary Examiner—Steven L. Stephan
Assistant Examiner—Jeffrey Sterrett
Attorney, Agent, or Firm—Leydig, Voit & Mayer

[57] ABSTRACT

In the control method for a PWM converter according to the present invention, an upper limit value of an inphase component of an instruction voltage for controlling an AC/DC converter is prescribed, and in the region where the upper limit value is exceeded, the inphase component of the instruction voltage is controlled to be within the prescribed upper limit value by setting a reactive component value corresponding to the exceeding quantity. This makes it possible to offer a low priced, stable control method for a PWM converter.

1 Claim, 3 Drawing Sheets

CONTROL METHOD FOR PWM CONVERTER

BACKGROUND OF THE INVENTION

1. Field of the Invention

The present invention relates to the improvement of a control method for a PWM converter.

2. Description of the Prior Art

A Japanese patent publication No. 37864/86 is an example of a control device which controls reactive power in an AC/DC converter. This is a control device for an AC motor using a voltage type pulse-width-modulation inverter, wherein reactive power at the side of an AC power supply and a DC output voltage of an AC/DC converter are detected, and the magnitude of an inphase component voltage (hereinafter referred to as an inphase voltage) with respect to the power supply voltage is controlled so as to regurate the reactive power to a prescribed value, at the same time the magnitude of a component voltage having a phase of 90 degrees different from that of the power supply voltage (hereinafter referred to as an orthogonal voltage) is controlled so as to regurate a DC voltage to a prescribed value. In this way, motor operation and regenerative breaking of a motor are made possible, and also the power factor of the AC power supply can be improved.

In PWM inverters, the one for improving output voltage fluctuations during voltage discontrolled intervals caused by an inductive load is described, for example, in a Japanese patent, laid open No. 229676/85.

There has been a point of issue in a conventional voltage type PWM AC/DC converter constituted as mentioned in the above that when a power supply voltage is ascending, especially when a regenerative current is increasing, a set value $Vd^*$ of an orthogonal voltage and a set value $Vq^*$ of an inphase voltage become large as described later, because of this a voltage instruction-value $V^*$ (for each phase of AC three-phase voltage, $Vu^*$, $Vv^*$ or $Vw^*$ respectively) becomes large.

FIG. 1 is a vector diagram for explaining the above-mentioned point. In the figure, let E be a power supply voltage, let Iq be an active current and if a reactive current Id=0, the output current I is equal to the active current Iq and its phase is inphase with the power supply voltage E. The voltage drop through a reactor (in FIG. 2 described later, it corresponds to a part of a reference number 2) is $\omega LI$ which is inserted between the AC power supply (in the same figure it corresponds to a part of a reference number 1) and a power converter (in the same figure it corresponds to a part of a reference number 3). Therefore as shown in the figure, the voltage instruction value $V^*$ is expressed in the equation $V^* = E - \omega LI$, and $Vd^*$ and $Vq^*$ are components of the voltage instruction-value $V^*$ respectively, $Vd^*$ is an orthogonal-voltage set-value with a phase making a right angle with the phase of the power supply voltage E, and $Vq^*$ is an inphase-voltage set-value being inphase with the power supply voltage E.

As clearly shown in the figure, under the above-mentioned condition with a good power factor, the voltage instruction-value $V^*$ becomes very large. A utilizable three-phase AC voltage is limited by a DC voltage Ed (in FIG. 2 described later, it corresponds to a detected voltage by a voltage detector 5), so that there is a problem that the control is apt to be plunged into unstableness caused by voltage saturation.

When an enough large voltage margin is given to the voltage saturation by adopting a high DC voltage Ed, the size of a device has to be made large for securing enough insulation.

SUMMARY OF THE INVENTION

The present invention is invented for solving the problems as mentioned in the above. An object of the present invention is to provide a low priced, compact PWM converter, wherein voltage saturation does not occur, and precise, stable control can be obtained, and bulky insulation against an enough high DC voltage Ed is not needed.

In a control method for a PWM converter according to the present invention, a limit value for an inphase voltage $Vq^*$ is set and when the inphase voltage reaches the limit value, the PWM converter is controlled to let a reactive current flow so as not to surpass the limit value of the inphase voltage.

The above mentioned object, other objects and new features of the present invention will be made clearer by reading the following detailed explanation referring to the attached drawings. These drawings however are solely for explanatory purposes, and so they do not limit the scope of the present invention.

DETAILED DESCRIPTION OF THE PREFERRED EMBODIMENT

Figure 1A:
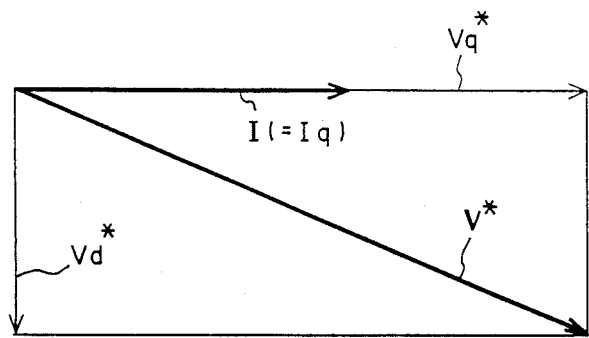
FIGS. 1a and 1b are vector diagrams for explaining the operation of a conventional PWM converter.
Figure 1B:
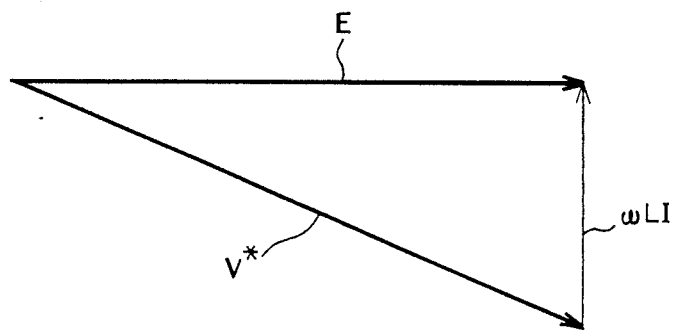
Figure 2:
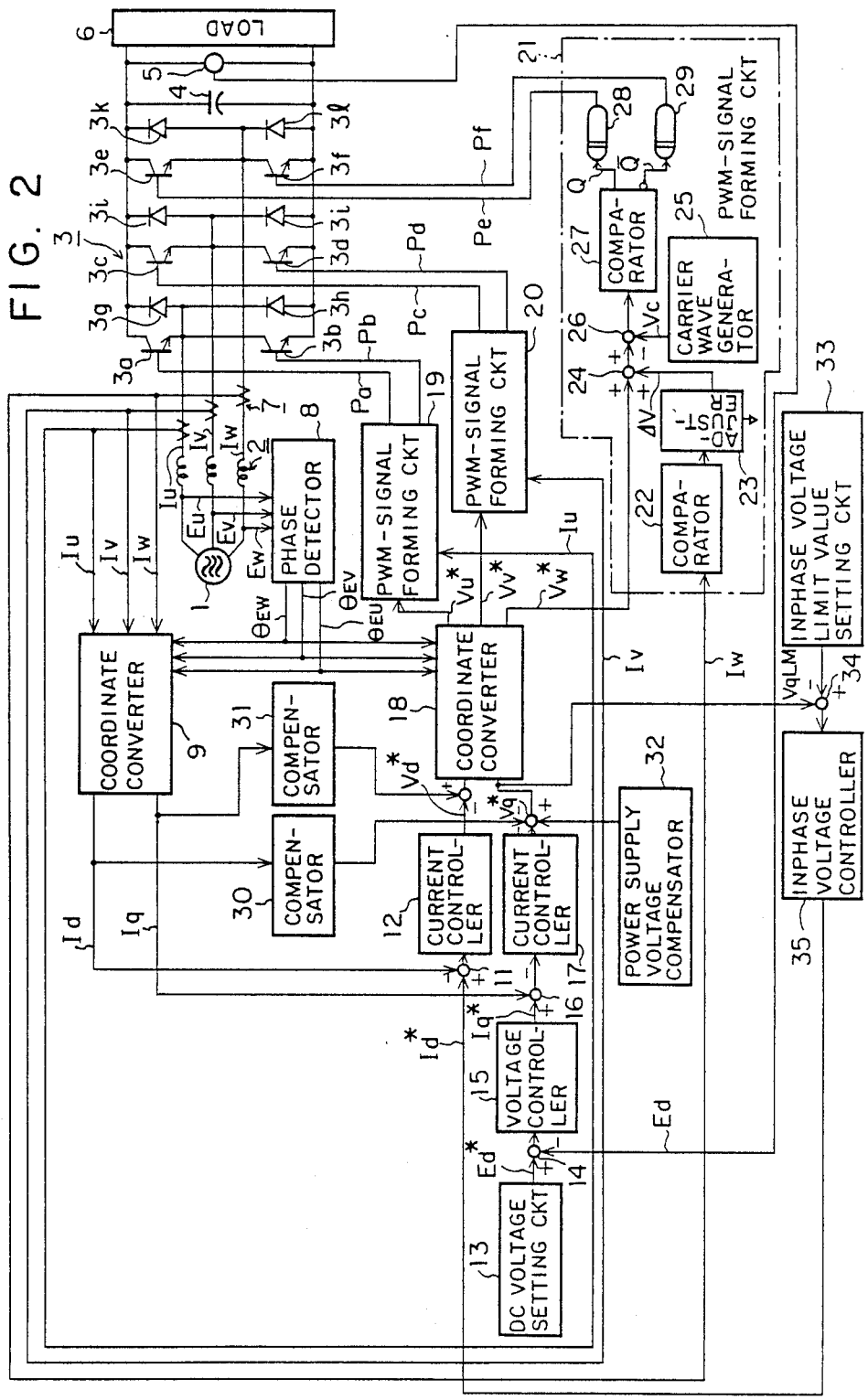
FIG. 2 is a block diagram showing a PWM converter according to an embodiment of the present invention.

An embodiment according to the present invention will be explained referring to FIG. 2 showing a block diagram of a PWM converter in the following:

In the figure, a reference number 1 expresses an AC power supply for supplying three-phase AC power of a U phase, a V phase and a W phase, and a reactor 2 is connected to a supply terminal of each phase. A part 3 is a power converter which comprises a plurality of transistors (switching elements) 3a to 3f and diodes (rectifying elements) 3g to 3l, and the connection point of each couple of these transistors 3a to 3f and diodes 3g to 3l is connected to a supply terminal of the AC power supply 1 through the reactor 2. The power converter 3 converts an AC power supplied from the AC power supply 1 to a desired DC power with a PWM signal from a PWM-signal forming circuit explained later. A part 4 is a smoothing capacitor for smoothing out a DC voltage Ed generated between the terminals of couples of transistors and couples of diodes of the power converter 3, and between the terminals of the smoothing capacitor 4 a voltage detector 5 and a load 6 are connected.

A part 7 are current detectors provided between the reactor 2 and the power converter 3, which detects the three-phase output currents Iu, Iv and Iw which flow between the AC power supply 1 and the power converter 3; a part 8 is a phase detector connected to the supply terminals of the AC power supply 1, which detects individual voltage phases $\theta Eu$, $\theta Ev$ and $\theta Ew$ of respective three-phase AC voltages Eu, Ev and Ew; a part 9 is a coordinate converter for converting three-phase output currents Iu, Iv and Iw into an orthogonal component current Id (hereinafter referred to as a reactive current Id) and an inphase component current Iq (hereinafter referred to as an active current Iq) adopting the AC power-supply voltage as a standard based on the voltage phases θEu, θEv and θEw in a rectangular coordinate system.

A part 11 is a subtracter for subtracting a reactive current Id from the reactive-current set-value Id*; a part 12 is a current controller which outputs an orthogonal-component-voltage set-value Vd* (hereinafter referred to as an orthogonal-voltage set-value) of an AC three-phase voltage instruction-value adopting the AC power-supply voltage as a standard based on a differential-current signal from the subtracter 11.

A part 13 is a DC voltage setting circuit which outputs a voltage set-value Ed* corresponding to a DC voltage Ed; a part 14 is a subtracter for subtracting the DC voltage Ed from the voltage set-value Ed*; a part 15 is a voltage controller which outputs an active-current set-value Iq* corresponding to an active current Iq based on a differential-voltage signal from the subtracter 14; a part 16 is a subtracter for subtracting the active current Iq from the active-current set-value Iq*; a part 17 is a current controller which outputs an inphase-component-voltage set-value Vq* (hereinafter referred to as an inphase-voltage set-value) of the AC three-phase voltage instruction-value adopting the AC power-supply voltage as a standard, based on a differential-current signal from the subtracter 16.

A part 18 is a coordinate converter connected to the current controllers 12 and 17, which converts orthogonal-voltage set-value Vd* and inphase-voltage set-value Vq* in rectangular coordinates to three-phase voltage instruction-values Vu*, Vv* and Vw* based on voltage phase angles θEu, θEv and θEw.

Parts 19 to 21 are three PWM-signal forming circuits having same constitutional elements to each other which output PWM signals Pa to Pf with pulse widths corresponding to voltage instruction values Vu*, Vv* and Vw*.

For example, a PWM-signal forming circuit 21 comprises: a comparator 22 for judging the polarity of an output current Iw; an adjuster 23 for outputting a voltage-compensation signal ΔV having a square-wave form corresponding to the output signal of the comparator 22; an adder 24 for adding the voltage-compensation signal ΔV to the voltage instruction-value Vw; a carrier wave generator 25 for outputting a carrier wave Vc of a chopping wave form; a subtracter 26 for subtracting the carrier wave Vc from the voltage instruction-value Vw* compensated by the adder 24; a comparator 27 for outputting ON signals Q and Q̄ corresponding to the output signal of the subtracter 26; and delay elements 28 and 29 for outputting PWM signals Pe and Pf obtained by delaying the rising edges of ON signals Q and Q̄ by the time corresponding to the voltage compensation signal ΔV.

Parts 30 and 31 are compensators; a part 32 is a power-supply-voltage compensator for compensating the power-supply voltage; a part 33 is an inphase-voltage limit-value setting circuit, which is limited by the DC voltage Ed, for setting a limit value VqLM of an inphase-voltage set-value Vq* not to cause voltage saturation in AC three-phase voltages Vu, Vv and Vw; a part 34 is a subtracter for subtracting the inphase-voltage set-value Vq* from the inphase-voltage limit-value VqLM, the output of the inphase-voltage limit-value setting circuit 33; and a part 35 is an inphase-voltage controller for outputting a reactive current set-value Id* by, for example, integrating the output of the subtracter 34.

The operation shown in FIG. 2 is explained in the following.

A current detector 7 detects output currents Iu, Iv and Iw and inputs them to a coordinate converter 9 and to a PWM-signal forming circuits 19 to 21. A phase detector 8 detects voltage phases θEu, θEv and θEw of AC voltages Eu, Ev and Ew and inputs them to coordinate converters 9 and 18.

These voltage phases θEu, θEv and θEw are expressed as shown in the following equations.

$$\theta Eu = 0$$

$$\theta Ev = 0 - (\tfrac{2}{3})\pi$$

$$\theta Ew = 0 + (\tfrac{2}{3})\pi$$

The coordinate converter 9 operates an orthogonal component Id (reactive current) and an inphase component Iq (active current) of an output current I which corresponds to the DC quantity of output currents Iu, Iv and Iw, adopting the power-supply voltage E as a standard which corresponds to the DC quantity of AC voltages Eu, Ev and Ew by the equation as shown below.

$$\begin{vmatrix} Id \\ Iq \end{vmatrix} = (2/3)^{\frac{1}{2}} \begin{vmatrix} \cos\theta Eu, & \cos\theta Ev, & \cos\theta Ew \\ -\sin\theta Eu, & -\sin\theta Ev, & -\sin\theta Ew \end{vmatrix} \begin{vmatrix} Iu \\ Iv \\ Iw \end{vmatrix} \quad (1)$$

By this operation a reactive current Id and an active current Iq are converted to a DC quantity.

A reactive current Id is subtracted from reactive-current set-value Id*, which is obtained with a method described later, with the subtracter 11 to obtain a differential-current signal and the signal is input to the current controller 12. The current controller 12 outputs an orthogonal-voltage set-value Vd*, orthogonal with a power-supply voltage E, of a voltage instruction value V* which corresponds to a DC quantity of voltage instruction-values Vu*, Vv* and Vw* obtained by processing the differential-current signal, for example, by proportional-plus-integral operation.

A DC voltage Ed is subtracted from a voltage set-value Ed* generated in a DC voltage setting circuit 13 with a subtracter 14 to form a differential-voltage signal and it is input to a voltage controller 15. The voltage controller 15 processes a differential-voltage signal, for example, by a proportional-plus-integral operation and outputs an active-current set-value Iq* of an output current I, the Iq* which becomes an inphase component when the power supply voltage E is employed as a standard. An active current Iq is subtracted from the active-current set-value Iq* to form a differential-current signal with a subtracter 16 and it is input to a current controller 17. The current controller 17 processes the differential-current signal, for example, by proportional-plus-integral operation and outputs an inphase-voltage set-value Vq* of a voltage instruction-value V*, the voltage Vq* which is inphase with the power-supply voltage E.

A coordinate converter 18 operates three-phase AC voltage instruction-values Vu*, Vv* and Vw* based on both an orthogonal-voltage set-value Vd* and an inphase-voltage set-value Vq* by the equation as shown below.

$$\begin{vmatrix} Vu^* \\ Vv^* \\ Vw^* \end{vmatrix} = (2/3)^{\frac{1}{2}} \begin{vmatrix} Cos\theta Eu, & -sin\theta Eu \\ Cos\theta Ev, & -sin\theta Ev \\ Cos\theta Ew, & -sin\theta Ev \end{vmatrix} \begin{vmatrix} Vd^* \\ Vq^* \end{vmatrix} \quad (2)$$

By this operation, the orthogonal-voltage set-value Vd* and the inphase-voltage set-value Vq* corresponding to a DC quantity are converted to AC quantities, voltage instruction-values Vu*, Vv* and Vw*, and each of them is respectively input to the PWM signal forming circuits 19 to 21.

Now, the explanation will be given to the PWM-signal forming circuit 21 of the W phase, when a voltage compensation signal ΔV is 0. The carrier wave Vc is subtracted from the voltage instruction-value Vw* with a subtracter 26, and the remainder is input to a comparator 27.

The comparator 27 compares the voltage instruction-value Vw* and the carrier wave Vc based on the output signal of the subtracter 26, and while Vw* > Vc, it outputs an ON signal Q, and while Vw* < Vc, it outputs an ON signal Q. The rise edges of these ON signals Q and Q are delayed by delay elements 28 and 29 and are output as PWM signals Pe and Pf for turning on transistors 3e and 3f respectively. The delay elements 28 and 29 prevent an arm-short-circuit caused by the turn-off delay of transistors 3e and 3f.

Figure 3A:
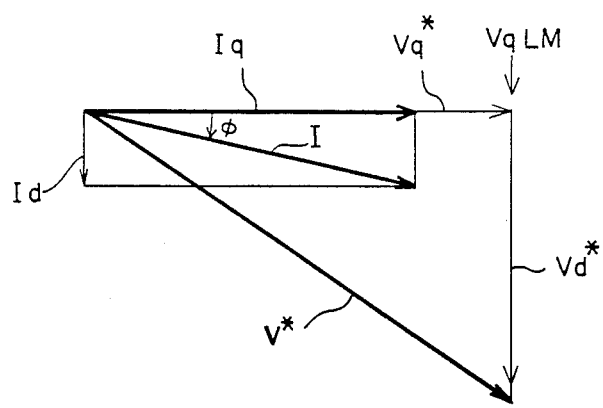
FIGS. 3a and 3b are vector diagrams for explaining the operation of the device shown in FIG. 2.
Figure 3B:
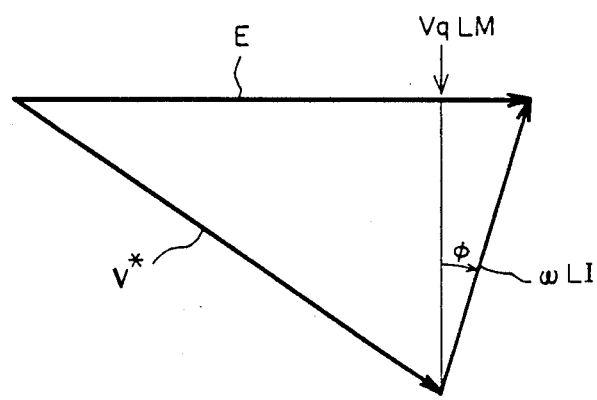

An inphase-voltage limit-value setting circuit 33 is limited by a DC voltage Ed, and outputs an inphase-voltage limit-value VqLM, a limit value of an inphase-voltage set-value Vq*, so as not to saturate AC three-phase voltages Vu, Vv and Vw. An inphase-voltage set-value Vq* is subtracted from the inphase-voltage limit-value VqLM with a subtracter 34. An inphase-voltage controller 35 carries out an integral of the output of the subtracter 34, and when the inphase-voltage set-value Vq* is larger than the inphase-voltage limit-value VqLM, the result of the above integral operation is output as the previously stated reactive-current set-value Id*, and when the inphase-voltage set-value Vq* is smaller than the inphase-voltage limit-value VqLM, 0 is output. In other words, when the inphase-voltage set-value Vq* becomes larger than the inphase-voltage limit-value VqLM, a reactive current Id flows and the inphase-voltage set-value Vq* is limited to the inphase-voltage limit-value VqLM. This is shown in the vector diagrams of FIG. 3.

When the inphase-voltage set-value Vq* becomes larger than the inphase-voltage limit-value VqLM, a reactive-current set-value Id* is set at a prescribed value and a reactive current Id flows. The output current I is the vector sum of the reactive current Id and an active current Iq, and the power factor angle is φ. In the same way, the voltage drop ωLI across the reactor 2 is a vector sum of a voltage drop ωLId by a reactive current Id and a voltage drop ωLIq by an active current Iq, and the voltage instruction-value V* becomes as shown in the figure.

Therefore, the inphase-voltage set-value Vq*, an inphase component with the power supply voltage E, of the voltage instruction-value V*, is limited to the inphase-voltage limit-value VqLM.

As described in the above, in a PWM converter according to the present invention, when an inphase-voltage set-value Vq* reaches a limit value VqLM of an inphase-voltage set-value, a reactive current corresponding to the inphase voltage Vq* is made to flow, so that the inphase voltage Vq* does not exceed its limit value Thus, it is made possible to obtain a low priced, compact, and precisely and stably controllable PWM converter.

What is claimed is:

1. A control method for a PWM converter, being provided with a PWM controlled power converter for converting AC power supplied from an AC power supply to DC power, comprising:
    a first step of setting an upper limit value of an inphase-voltage set-value, being in phase with the AC power supply, of an instruction voltage which controls said power converter, and
    a second step of limiting the inphase-voltage set-value of said instruction voltage up to said upper limit value by setting a reactive-voltage set-value of the instruction voltage whose phase is orthogonal with the AC power supply and whose amplitude is equivalent to a surplus of the inphase-voltage set-value of the instruction voltage to said upper limit value in case of the inphase-voltage set-value exceeding the upper limit value.

* * * * *